United States Patent
Borkar

[19]

[11] Patent Number: 5,880,945
[45] Date of Patent: Mar. 9, 1999

[54] POWER CONVERSION AND LOAD CIRCUIT ON SAME INTEGRATED CIRCUIT

[75] Inventor: Shekhar Yeshwant Borkar, Portland, Oreg.

[73] Assignee: Intel Corporation, Santa Clara, Calif.

[21] Appl. No.: 885,113

[22] Filed: Jun. 30, 1997

[51] Int. Cl.⁶ .................................................. H02M 7/00
[52] U.S. Cl. ............................................................. 363/65
[58] Field of Search .............................. 323/273; 363/65, 363/69, 70

[56] References Cited

U.S. PATENT DOCUMENTS

| | | | |
|---|---|---|---|
| 4,999,761 | 3/1991 | Bingham et al. | 363/63 |
| 5,153,583 | 10/1992 | Murdoch | 340/825.54 |
| 5,305,186 | 4/1994 | Appelt et al. | 361/704 |
| 5,479,335 | 12/1995 | Saito et al. | 363/69 |
| 5,583,753 | 12/1996 | Takayama | 363/65 |
| 5,737,202 | 4/1998 | Shimamori | 363/65 |

*Primary Examiner*—Stuart N. Hecker
*Attorney, Agent, or Firm*—Blakely, Sokoloff, Taylor & Zafman LLP

[57] ABSTRACT

A power conversion apparatus is disclosed where the active components of the power conversion system are integrated into the integrated circuit for which power is being supplied. Additionally, at least some of the passive components of the power conversion system remain external to the integrated circuit.

15 Claims, 9 Drawing Sheets

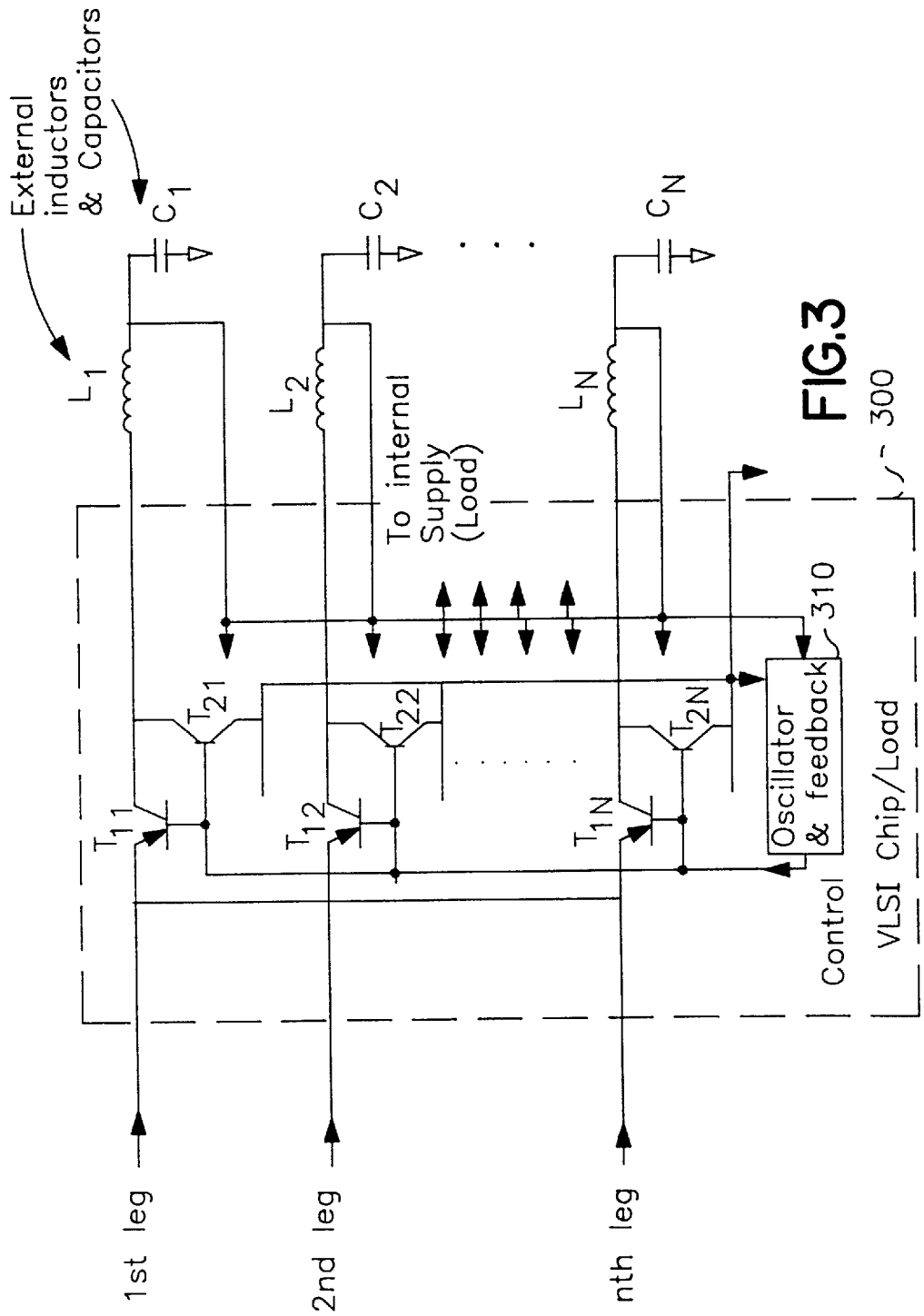

POWER CONVERSION AND LOAD CIRCUIT ON SAME INTEGRATED CIRCUIT

BACKGROUND OF THE INVENTION

1. Field of the Invention

The invention relates generally to power systems for integrated circuits. More specifically, the invention relates to power conversion systems for low voltage, high current, integrated circuits.

2. Description of Related Art

As the power consumption of microprocessors and integrated circuits grow even beyond the 100 watt level, so too does the generated heat which must be dissipated. The traditional method of mounting the microprocessor on the motherboard and then applying upon it a heatsink and/or cooling fan will be inadequate for high level of power consumption. One solution for adequate heat dissipation is to mount the microprocessor on the back-chassis of a computer system since the back-chassis is usually composed of sheet-metal or other conductive material and is also exposed on the other side directly to the surrounding environment.

As the generated power of microprocessors grows to such high level, one must reduce the supply voltage to reduce the power dissipation. Power dissipation decreases quadratically with the supply voltage while the supply current decreases linearly with the supply voltage. The combined effect is that the supply current grows even though the power stays constant (due to reduced voltage). When a microprocessor is connected to the chassis, the chassis itself provides one of the high current terminals, but the other high current terminal must be connected to the microprocessor itself. Since the currents are high (on the order of 100s of amperes), the conductor has to be thick to reduce the voltage drop across the conductor and to reduce the noise due to inductance.

Prior art systems, as shown in FIG. 1, mounted a high voltage to low voltage converter 100 directly onto motherboard 120. A microprocessor 160 is mounted on a socket 125 of motherboard 120 and is attached to cooling devices such as a heat sink 140 and cooling fan 150. The converter 100 is located as close to the microprocessor 100 as possible to reduce the voltage drop over the large number of pins and conductors which must carry a large current. Converter 100 is connected to high voltage source and provides via connections 115 an output of low voltage, high current supply. When the microprocessor is mounted on the back chassis, the connection length and path from the top of the motherboard through the motherboard or around the motherboard increases the size and length of conductors required to supply the high current.

The typical voltage converter employed in microprocessor-based systems is a switching converter such as that shown in FIG. 2(a). A control signal 120 when asserted low will switch transistor $T_1$ on and switch off transistor $T_2$ allowing a large current to build up in inductor 130 which is coupled in series with transistor $T_1$. Inductor 130 offers inertia for changes in its current and hence, will divert charge to capacitor 140, coupled at the output terminal 105, which builds a voltage across it. An oscillator and feedback system 150, coupled to capacitor 140 and transistor $T_1$, compares a reference voltage (internally or externally supplied) with an output voltage 145 measured across capacitor 140. When the output voltage 145 is higher than the reference voltage, the oscillator and feedback system 150 will modify control signal 120 with shorter timing intervals so that $T_1$ is switched on for a shorter duration, resulting in less current through inductor 130 and consequently, less output voltage. When output voltage 145 is less than the reference voltage, the oscillator and feedback system 150 will lengthen the timing interval of control signal 120 so that $T_1$ is switched on for a longer duration, resulting in more current through inductor 130 and more output voltage.

FIG. 2(a) shows that power conversion is being performed for the benefit of a VLSI (Very Large Scale Integration) chip/load 170 that consumes the power from the output terminal 105. The voltage converter is external to load which it supplies. A first section of the switching converter 101 containing $T_2$ and oscillator and feedback system 150 may be implemented using discrete components or as an integrated chip. Transistor $T_1$ is typically implemented as a single component on the PC (printed circuit) board. Thus, the power transfer must occur through wires/connectors external to the load. Inductor 130 and capacitor 140 are also components mounted on the PC board or motherboard and are shown as block 103.

FIG. 2(b) shows a prior art switching voltage regulator 2000 which controls the power transferred to a load microprocessor/VLSI (or IC (Integrated Circuit)) chip 2700. Again, transistor T1, an inductor 2130 and a capacitor 2140 are mounted externally as is the voltage regulator. This voltage regulator has the control logic, previously described, and is typically implemented as a small analog integrated circuit. The FIGS. 2(a) and 2(b) systems are well-known in the prior art and have been implemented with a wide variety of components such as diodes and PMOS and NMOS transistors. When an external voltage converter is utilized, the output of the converter has to supply the high current to the microprocessor, or any such integrated circuit, that is mounted away from the voltage converter. To carry such high current over a long distance while limiting the voltage drop across the conductor, and while limiting the di/dt noise is very difficult. The difficulty arises in that a large current demands some combination of thicker conductors and/or a large number of supply pins to the IC or microprocessor. This also increases the area used up by the microprocessor and/or IC on the board or backplane.

To circumvent this problem, a power conversion system is needed which will allow a high voltage and low current source to be supplied to microprocessor or IC and then converted into a low voltage, high current source at/near the die of the microprocessor and/or IC where the high current is actually desired.

Thus, there is a need for a power conversion system that can be integrated efficiently into a microprocessor or IC such that a low current, high voltage source may be supplied to the microprocessor or IC thereby reducing the cost and complexity of the system in which the microprocessor or IC is employed.

SUMMARY

A power conversion apparatus is disclosed where the active components of the power conversion system are integrated into the integrated circuit for which power is being supplied. Additionally, at least some of the passive components of the power conversion system remain external to the integrated circuit.

BRIEF DESCRIPTION OF THE DRAWINGS

FIG. 3 is a schematic of a first embodiment of the invention.

DETAILED DESCRIPTION OF THE INVENTION

FIG. 3 is a schematic of a first embodiment of the invention.

In FIG. 3, and throughout the various embodiments of the invention, "active" components are logic elements such as transistors $T_{11}$ through $T_{1N}$ and $T_{21}$ through $T_{2N}$ and oscillator and feedback circuit 310. "Passive" elements refer to such as inductors $L_1$ through $L_N$ and capacitors $C_1$ through $C_N$. In most embodiments, the active elements are integrated onto the chip/load consuming the power, while passive components in most instances remain external to the load.

Figure 1:
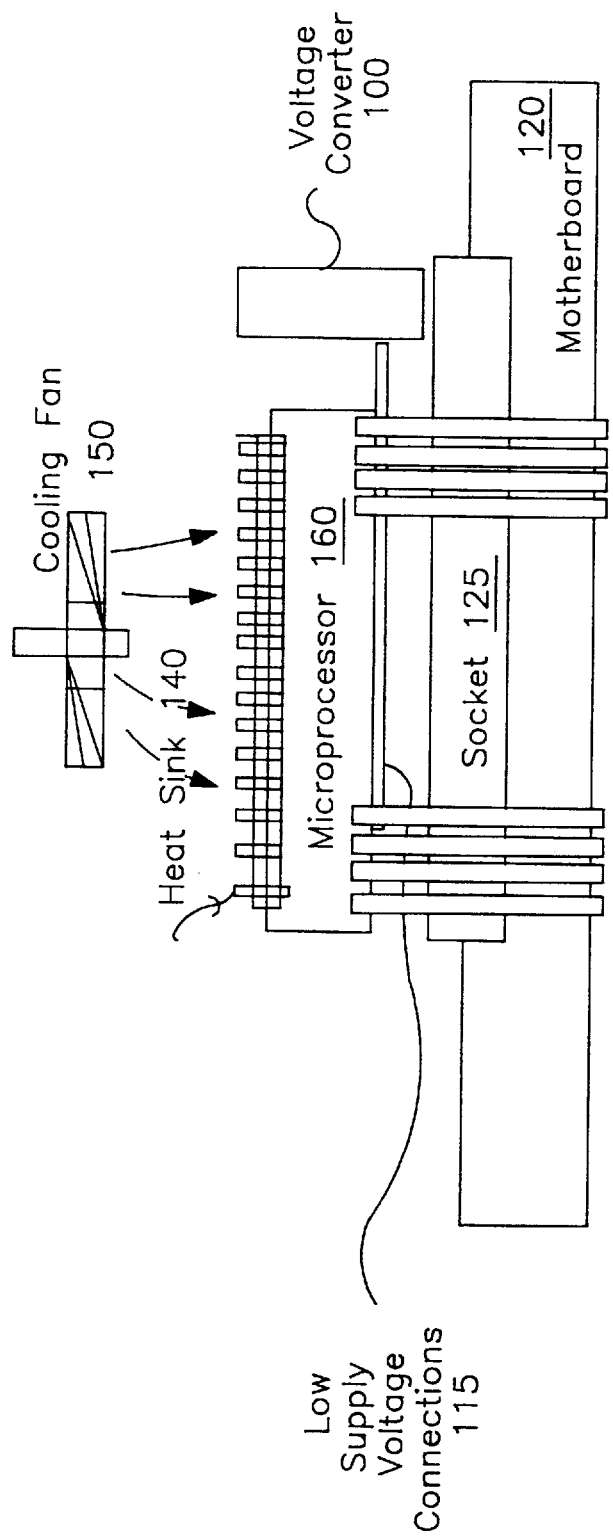
FIG. 1 is an illustration of the mounting of a voltage converter according to the prior art.
Figure 2A:
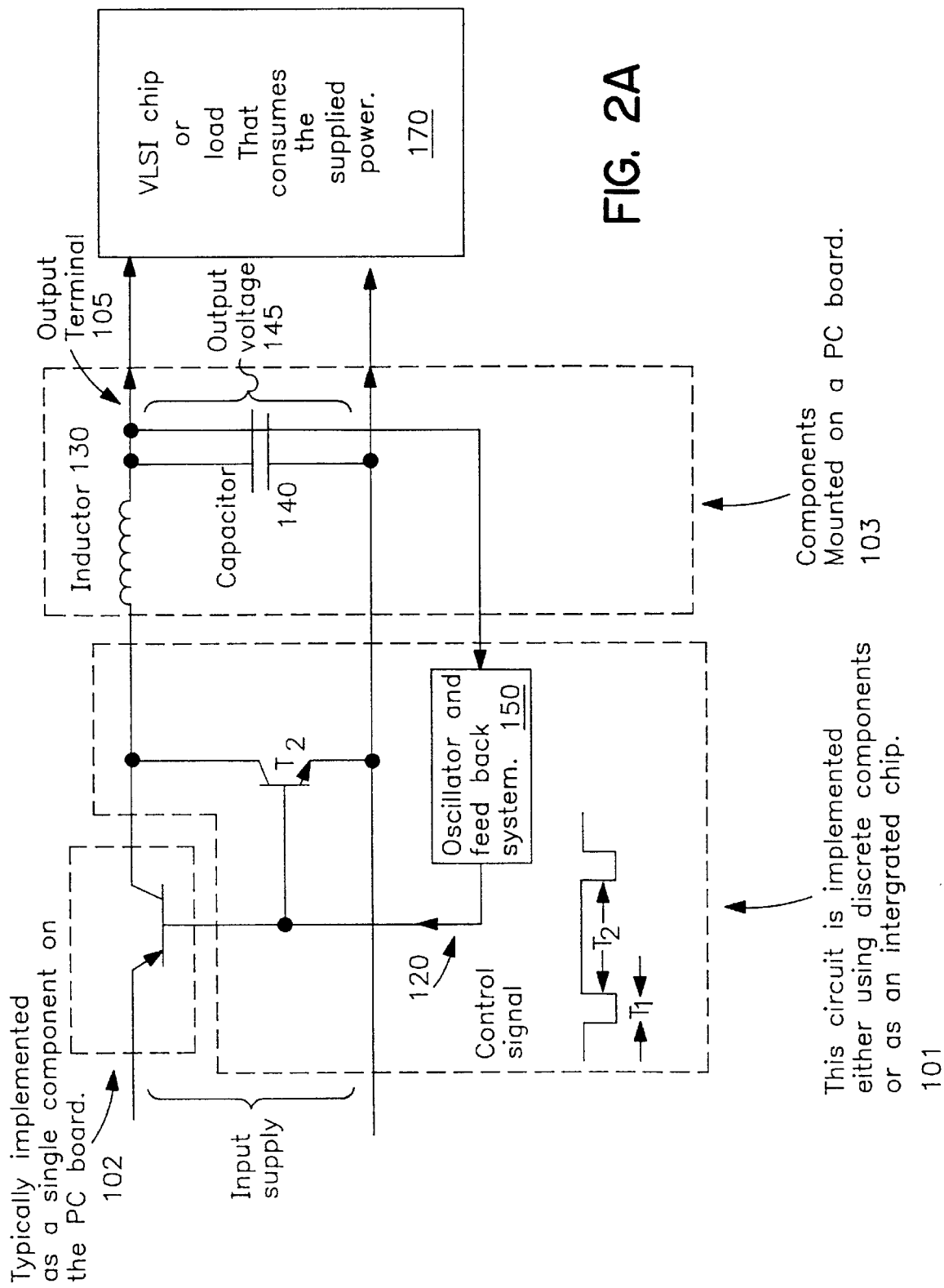
FIGS. 2(a) and 2(b) are illustrations of typical voltage converters according to the prior art.
Figure 2B:
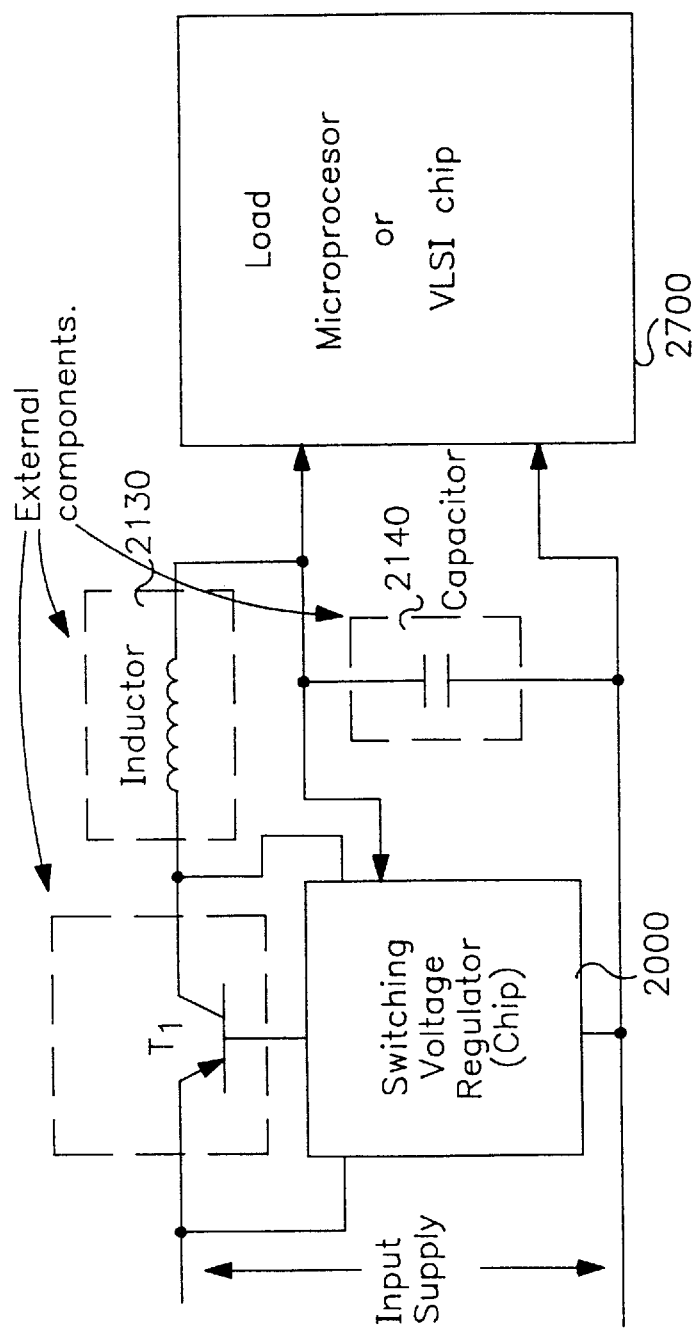

The converter shown in FIGS. 3 through 8 operate similar to the converter of FIG. 2(*a*), and thus, will not be repeatedly explained. Though the embodiments herein describe legging and integration of various components, each embodiment can be implemented by one skilled in the art to operate characteristically like the converter of FIG. 2(*a*) by modifying the choice of values, tolerances and specifications for those components.

The input current to the converter though smaller than the output current, is still very high, on the order of 10's of amperes. Thus, it would be advantageous to split the current carrying path into multiple current carrying paths or "legs" as shown in FIG. 3. In the first embodiment, each leg is connected in parallel with another leg and consists of a pair of transistors, an inductor and a capacitor. FIG. 3 shows a converter split into N current carrying legs, and since each leg is in parallel, the currents $I_1$ through $I_N$ will add at the output to supply a total current of I. Thus, if the total current required at the output of the converter is M amperes, each leg would only need to carry M/N amperes, where N is the total number of current carrying legs. There are key advantages of distributing the current carrying burden across multiple paths. First, each of the pairs of transistors $T_{11}$ and $T_{21}$ through $T_{1N}$ and $T_{2N}$ would only have to switch N times less current and thus would operate faster. Though the size of each inductor $L_1$ through $L_N$ would have to be N times larger, the capacitors $C_1$ through $C_N$ would each have to provide only 1/N the total capacitance required.

In the first embodiment, all the components of the converter were repeated in each leg of the system. However, based on certain system constraints (such as quality factor of the inductors, size, etc.) which will be described below, it may be advantageous to split into multiple legs only certain of the components and not others. Further, each component may be split into a different number of legs as is most efficient based on system constraints. FIG. 3 shows a primary feature of invention. The transistor pairs $T_{11}$ through $T_{1N}$ and $T_{21}$ through $T_{2N}$ are integrated onto a VLSI chip/load 300 which is to consume the power. Further, the oscillator and feedback circuit 310, which controls switching, is also integrated onto the load consuming chip. These active elements are thus said to be integrated onto the chip/load 300. Though capacitors $C_1$ through $C_N$ and inductors $L_1$ through $L_N$, the passive elements are external, all of the other components of the switching converter are now part and parcel of the microprocessor or load itself. The load is supplied internally and thus much of the external wiring/conductors plaguing the prior art systems are eliminated.

By integrating on chip/load the active components of the power conversion system, the average input current into the system is reduced, (since the input current is supplied at higher voltage) the output voltage to the load is supplied through low resistance and low inductance path, thereby improving the performance of the system, and finally it reduces the cost of the overall system. Transistors $T_1$, $T_2$ through $T_{1N}$, $T_{2N}$ can be Bi-Polar or implemented in MOS, depending on the design constraint or desirability.

Figure 4:
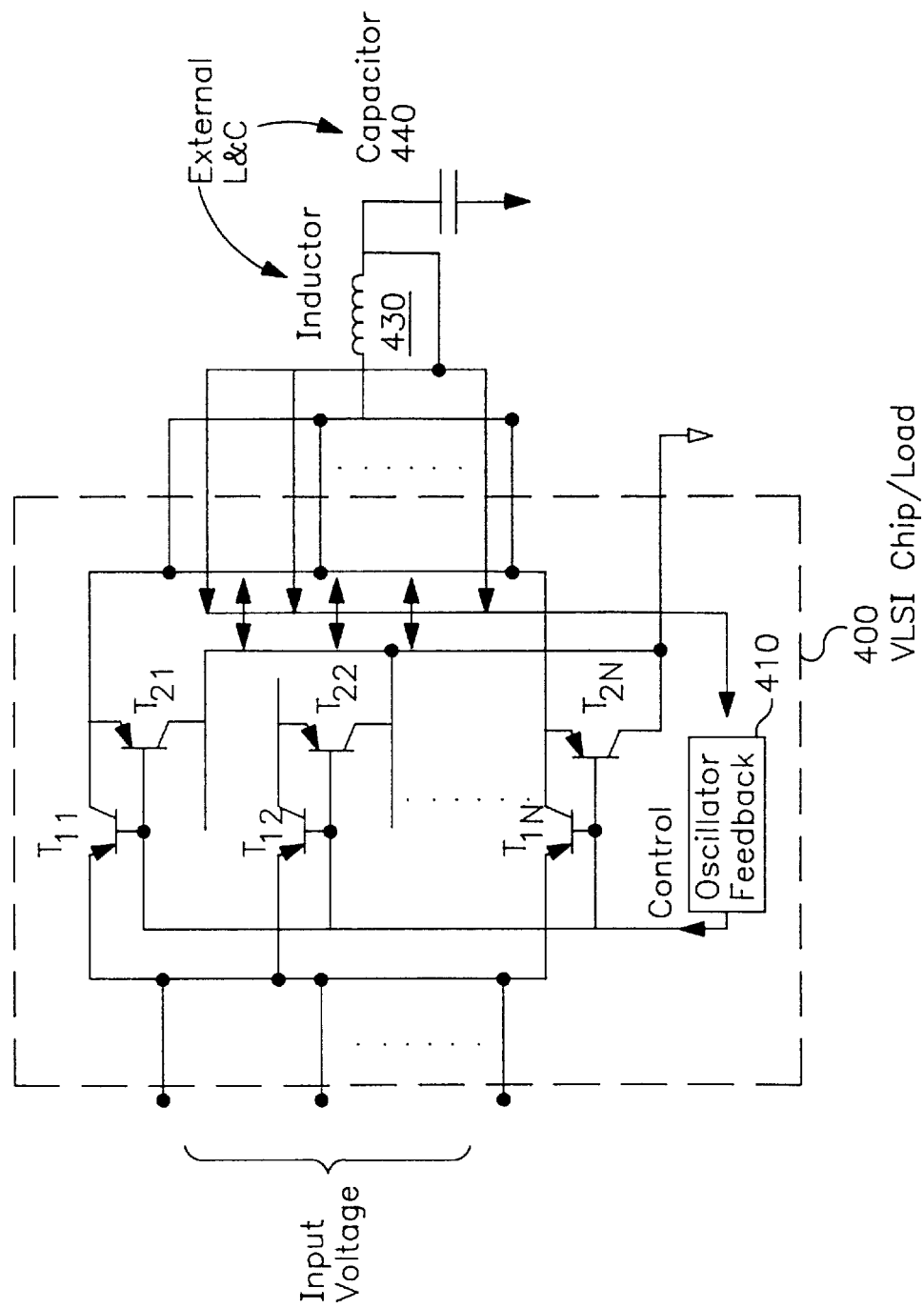
FIG. 4 is a schematic of a second embodiment of the invention.

FIG. 4 shows a schematic of a second embodiment of the invention.

Rather than split all elements of the converter into multiple paths, it may be advantageous to "leg" or split only the control transistors. Since the average input current is high (in comparison to the output current), the control transistors $T_1$ and $T_2$, shown in FIG. 2(*a*), become larger in size as does the single conductor coupling the transistor to the input voltage/current source. When the transistor pair is split into N multiple legs, as shown in FIG. 4, the current carried by each pair is only 1/N of the total current. Thus, it is easier to implement the larger control transistors as a plurality of smaller transistors, thereby distributing the burden of voltage conversion across transistor sets, rather than concentrating it on a single set of large transistors. Thus, a set on N legs 13 shown with transistor pairs $(T_{11}, T_{21})$ through $(T_{1N}, T_{2N})$. All of the transistors, as well as the oscillator and feedback circuit 410, unlike the prior art, are integrated onto a VLSI chip/load 400 which consumes the supplied power. Unlike FIG. 3, only the transistors are legged, the inductor 430 and capacitor 440 are external and remain as single components. Such an embodiment where only transistors are legged, is desirable when the values of capacitor and inductor required for power conversion are such that they can be each implemented as a single component. Thus, the capacitor and the inductor do not need to be "legged" for implementation. This embodiment is also desirable when the currents are not so high, and do not warrant legging of inductors and capacitors.

Figure 5:
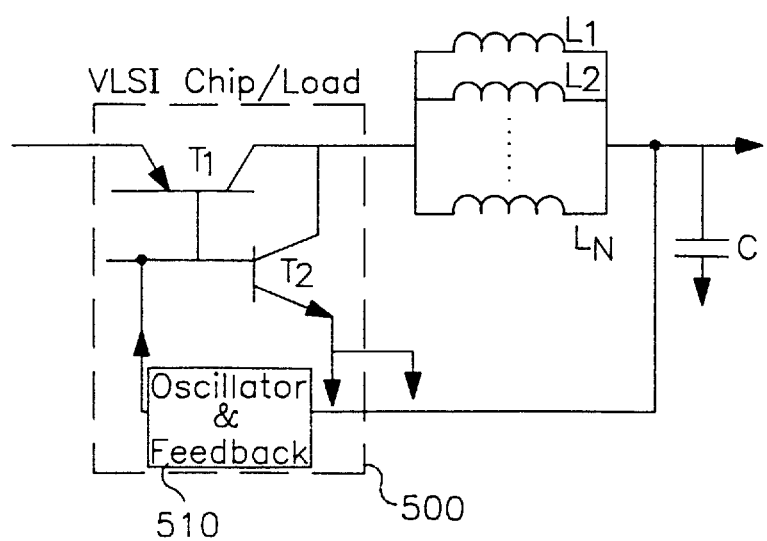
FIG. 5 is a schematic of a third embodiment of the invention.

FIG. 5 shows a schematic of a third embodiment of the invention.

Rather than split all elements of the converter into multiple paths as with the embodiment shown in FIG. 3, it may be advantageous to "leg" or split the inductor. FIG. 5 shows N such inductors, which are connected in parallel, and thus, each inductor $L_1$, $L_2$ through $L_N$ is approximately N times as large. Inductors are rated by a quality factor (Q) which is a ratio of reactance ($2\pi fL$) over resistance. If the oscillation frequency f is high, then for a given Q factor, the inductance should be chosen low. A high oscillation frequency places increased demands upon electronic components, so that depending on the application, the appropriate frequency should be chosen. When it is difficult to manufacture an inductor small enough to give rise to high frequency, but yet maintain a good Q factor, which is a measure of efficiency, the inductance can be legged N times reducing the burden of manufacture by increasing the size of the inductor. Since the N paths are split in parallel, as shown in FIG. 5, the current through each inductor is only 1/N. Typically, the inductors are placed external to the chip, and it is difficult to implement an inductor with small inductance value and high qualify factor. Hence it is advantageous to split the inductor into large number of large inductors, when they can be implemented relatively easily with higher quality factor. Larger inductance may be achieved by using thinner conductor, and hence could take same or smaller space than a smaller inductor. Further, larger space as needed to reduce inductance because you have to use thicker wire. The size of the inductor is not a limiting factor because it is implemented external to the chip/load 500. Advantageously, as in other embodiments, the transistors $T_1$ and $T_2$ and oscillator and feedback circuit 510 remain integrated onto the VLSI chip/load 500.

Figure 6:
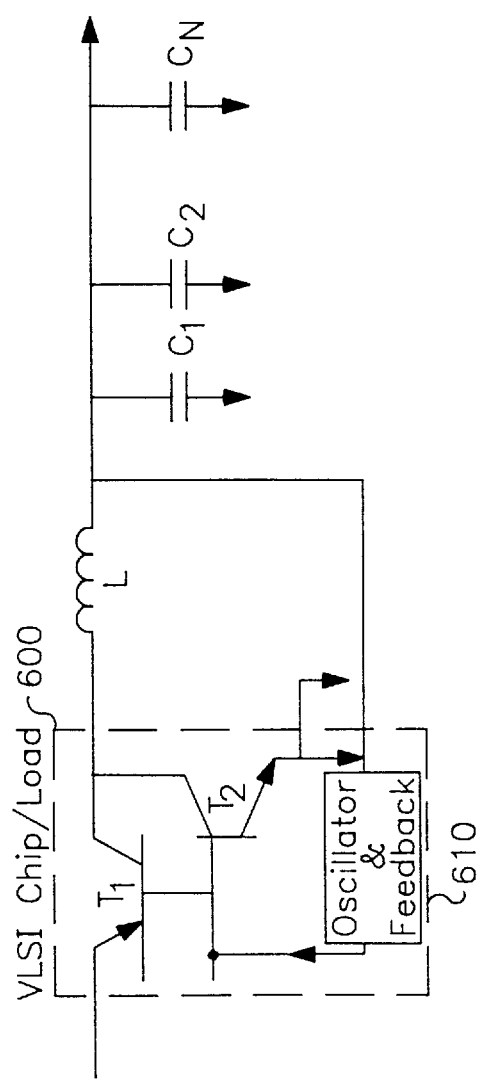
FIG. 6 illustrates a system diagram according to one embodiment of the invention.

FIG. 6 is a schematic according to a fourth embodiment of the invention.

Since the capacitor stores energy until it can be output to the dissipation circuitry, it provides a large output current, and is therefore a large value of capacitance. When the capacitors are legged N times as shown in FIG. 6, each capacitor $C_1$, $C_2$ ... $C_N$ is 1/N the value of a non-legged capacitor. The smaller values of capacitors help integrate them onto the chip, rather than implementing on the board, thereby reducing cost. This once again helps distribute the capacitor all over the chip, rather than at a central location on the chip.

By reducing the size of the capacitors, the capacitors can be implemented on the VLSI chip/load 600 instead of externally as with other embodiments. A single huge capacitor would not be as easy to integrate onto the chip/load 600 as would a multitudes of smaller capacitors which may be fit into the small gaps between elements already on the chip/load 600. Thus, less "area" would be needed to implement the power conversion system. As with other embodiments, transistors $T_1$ and $T_2$ as well as oscillator and feedback circuit 610 are integrated onto chip/load 600.

Figure 7:
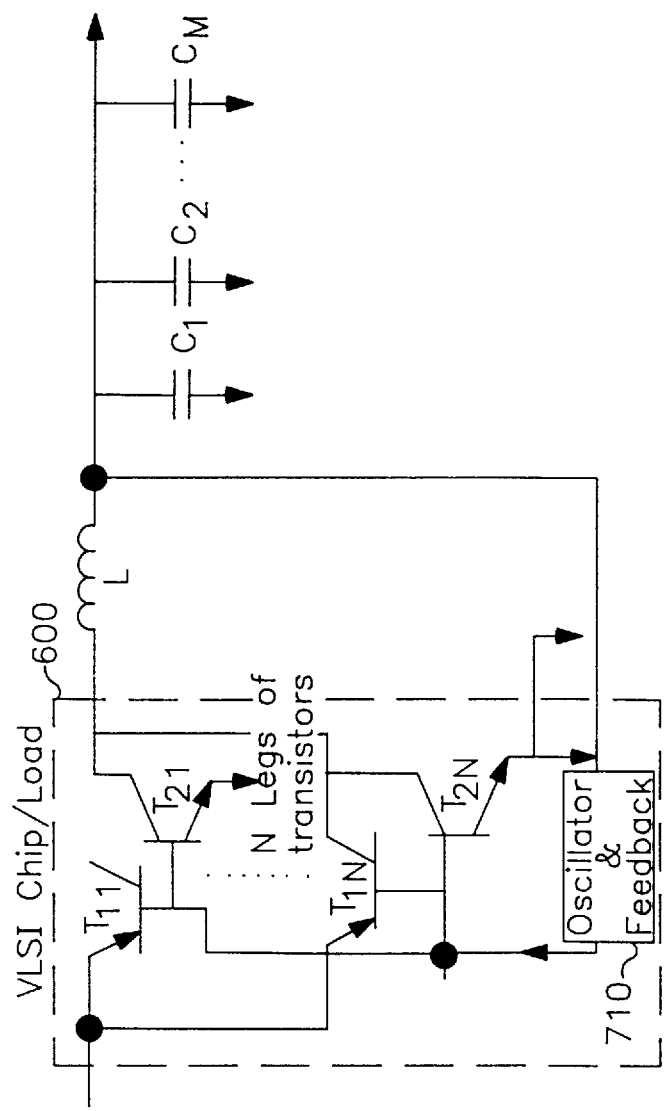
FIG. 7 is a schematic according to a fifth embodiment of the invention.

FIG. 7 is a schematic according to a fifth embodiment of the invention.

Rather than have the same number of legs, the number of legs for each transistor, inductor on capacitor component can be varied. FIG. 7 shows an exemplary embodiment where the transistors are legged N times, while the capacitors are legged M times. This depicts the advantage of legging individual elements—namely transistors, inductors, and capacitors—according to ease of implementation. Such a system can be configured according to overall cost, design constraints and implementation specific issues such as tolerable heat loss or allowable parasitic values.

Figure 8:
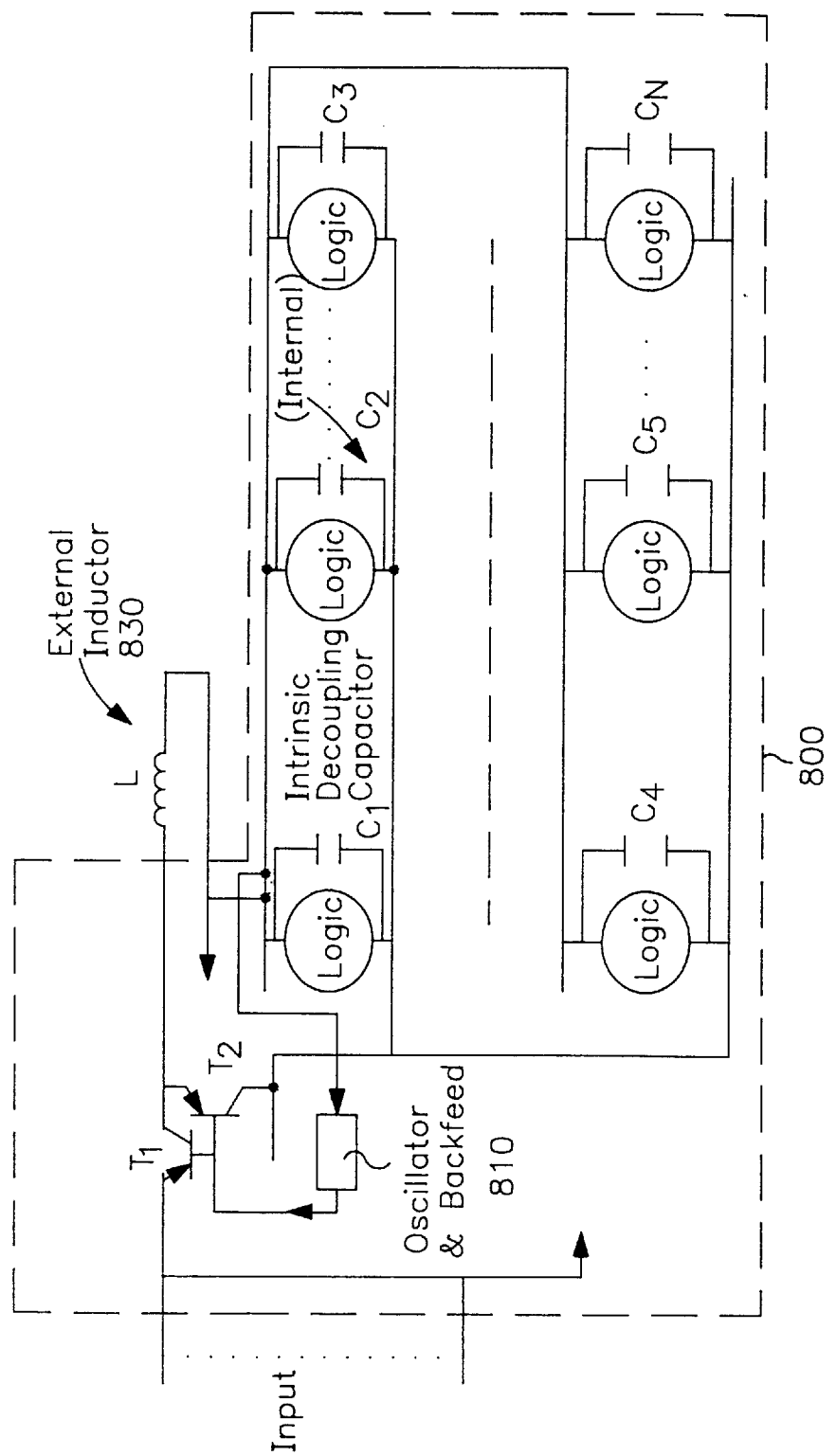
FIG. 8 is a schematic according to a sixth embodiment of the invention.

Again, the chip/load 700 integrates internally the N legs of transistors as well as oscillator and feedback circuit 710 and may, as shown in FIG. 8, integrate the M capacitors as well.

FIG. 8 is a schematic according to a sixth embodiment of the invention.

Typically, there is a decoupling capacitor on the chip between power and ground. This capacitor is either implicit in the form of parasitic capacitor between N-well and substrate on the chip, or implemented explicitly in the form of gate capacitance to help reduce power supply noise. This decoupling capacitor $C_D$ is between power and ground, and hence can be used "implicitly" as a part of the capacitor needed for the power conversion if such a power converter is implemented on the chip itself. This will eliminate, or at least reduce, the need for extra capacitor on the chip for power conversion.

Typically, the size of this decoupling capacitor is such that it can supply charge for the operation of the chip over a few clock cycles. However, by incrementally adding to the size of the decoupling capacitor, the decoupling capacitor can be used to serve dual functions, namely (1) reduce the noise, and (2) to store charge for the integrated power conversion.

As shown in FIG. 8, the decoupling capacitors $C_{D1}$ through $C_{DN}$ are integrated onto the VLSI chip/load 800 along with control transistors $T_1$ and $T_2$ and oscillator and feedback circuit 810. The inductor 830 remains external to the chip/load 800, but the decoupling capacitors used to reduce noise in logic elements of chip/load 800 are also shown coupled to function as charge storage for the power conversion.

What is claimed is:

1. A power conversion system for an integrated circuit comprising:

a plurality of current carrying legs, each leg supplying a portion of the total input current required by said power conversion system for supplying power to said integrated circuit;

a feedback control circuit coupled to said current carrying legs, said control circuit decreasing an output current by decreasing the total input current supplied by said legs if a voltage across said legs exceeds a reference voltage, said control circuit increasing the output current by increasing the total input current supplied by said legs if the voltage across said legs falls below said reference voltage, said feedback control circuit integrated onto said integrated circuit for which power is supplied; and a set of transistors coupled to said feedback control circuit, said set configured to regulate the amount of input current fed to said sower conversion system, said transistors switching according to a set of control signals generated by said feedback control circuits, said transistors integrated onto said integrated circuit for which power is being supplied.

2. A power conversion system according to claim 1 utilized to supply voltage and current to a microprocessor, said microprocessor residing on the back chassis of a computer system.

3. A power conversion system according to claim 1 wherein at least one of said current carrying legs comprises:

an inductive element coupled to said set of transistors, said inductive element configured to accumulate current provided through said set of transistors, said inductive element external to said integrated circuit.

4. A power conversion system according to claim 3 wherein at least one of said current carrying legs comprises:

a capacitive element coupled to said inductive element and to said feedback control circuit, said capacitive element configured to accumulate a voltage.

5. A power conversion system according to claim 4 wherein said feedback control circuit modifies the switching of said set of transistors in response to selected voltage charges across said capacitor.

6. A power conversion system according to claim 3 wherein each said inductive element has an increased inductance, said level of increase increasing geometrically with the number of current carrying legs having said inductive element.

7. A power conversion system according to claim 1 wherein each said set of transistors have a reduced current carrying capability, said level of reduction increasing geometrically with the number of current carrying legs having said set of transistors.

8. A power conversion system according to claim 3 wherein each said capacitive element has a reduced capacitance, the level of reduction increasing geometrically with the number of current carrying legs having said inductive element.

9. A power conversion apparatus supplying power to an integrated circuit comprising active components integrated into said integrated circuit and at least a portion of passive components external to said integrated circuit, said passive components including:

an inductive element coupled to a first portion of said active components; and a capacitive element coupled to said inductive element and to a second portion of said active components.

10. A power conversion apparatus according to claim 9 wherein said capacitive element is integrated into said integrated circuit.

11. A power conversion apparatus according to claim 10 wherein said capacitive element is also utilized to reduce noise on said integrated circuit.

12. A power conversion apparatus according to claim 9 wherein said active components comprise a set of control transistors.

13. A power conversion apparatus according to claim 12 wherein said active components further comprise a feedback an oscillator control circuit coupled to said set of control transistors and to said passive components, said feedback and oscillation control circuit configured to regulate the supply of power to said integrated circuit.

14. A power conversion apparatus according to claim 9 wherein a first set of said active components are legged.

15. A power conversion apparatus according to claim 9 wherein a first set of passive components are legged.

* * * * *

UNITED STATES PATENT AND TRADEMARK OFFICE
CERTIFICATE OF CORRECTION

PATENT NO.   : 5,880,945  
DATED        : March 9, 1999  
INVENTOR(S)  : Allen

It is certified that error appears in the above-identified patent and that said Letters Patent is hereby corrected as shown below:

<u>Column 6,</u>  
Line 39, delete "sower" and insert -- power --.

Signed and Sealed this

Thirtieth Day of September, 2003

JAMES E. ROGAN  
*Director of the United States Patent and Trademark Office*